United States Patent [19]
Fitter

[11] 3,875,970

[45] Apr. 8, 1975

[54] TUBING

[75] Inventor: John O. Fitter, East Northport, N.Y.

[73] Assignee: Manostat Corporation, New York, N.Y.

[22] Filed: Sept. 17, 1973

[21] Appl. No.: 398,004

Related U.S. Application Data

[63] Continuation of Ser. No. 128,353, March 25, 1971, abandoned.

[52] U.S. Cl. .............................. 138/110; 417/477
[51] Int. Cl. .......................................... F16l 11/12
[58] Field of Search ....... 417/477; 138/110, DIG. 3, 138/137, 140, 118, 145; 161/189, 206

[56] References Cited
UNITED STATES PATENTS

| 320,888 | 6/1885 | Ruffel | 417/476 |
| 2,849,962 | 9/1958 | Musser | 417/476 |
| 3,024,813 | 3/1962 | Sear et al. | 138/137 |

Primary Examiner—Jerry W. Myracle
Attorney, Agent, or Firm—Philip G. Hilbert

[57] ABSTRACT

A tubing particularly adapted for use in peristaltic pumps; the tubing having an inner tubular portion of a corrosion resistant resin and an outer tubular portion of a resilient elastomeric material, the inner and outer tubular portions coacting to withstand extreme conditions of usage due to the normal repeated alternating compression and expansion of the tubing when the pump is in use.

3 Claims, 3 Drawing Figures

PATENTED APR 8 1975  3,875,970

INVENTOR.
John O. Fitter
BY
Philip S. Hilbert
ATTORNEY

TUBING

This is a continuation of application Ser. No. 128,353, filed Mar. 25, 1971, now abandoned.

BACKGROUND OF THE INVENTION

Peristaltic pumps are well known in the art and are of particular interest when liquid or gas being pumped is either susceptible to contamination during he pumping process or is of such a nature as to corrode the elements of other pumping devices. Thus, liquids or gases which are corrosive, sterile or otherwise sensitive to pump elements, are handled with peristaltic pumps.

Peristaltic pumps basically comprise a fixed U-shaped bracket for backing up a flexible tubing which transmits the liquid or gas being pumped, together with rotating roller means for progressively squeezing and releasing the tubing which abuts the bracket.

The extreme conditions of usage to which such tubing is subject, tends to severely limit the life of the tubing, requiring frequent replacement of the same. Such conditions include the repeated deformation of the tubing as the same is squeezed and released, and the effect of the liquid or gas being pumped on the material from which the tubing is formed.

Thus, tubing used in peristaltic pumps must have a combination of properties including flexibility, resilience, resistance to creasing, resistance to adverse chemical or physical effects, since the pump may be used to pump diverse materials including acids, alkali, solvents, toxic and sterile liquids and gases.

Conventionally, such tubings are formed from silicone rubber, natural rubber, polychloroprene or polyvinyl chloride. However such materials have a limited resistance to degradation, thereby restricting the use of pumps including these tubings to liquids or gases having minimal degradation effects. Materials which show good resistance to corrosion or other forms of degradation, have been found to lack resilience and tend to crease in use, thereby limiting the life of such tubings.

Accordingly, an object of this invention is to provide improved flexible tubing which is subject to repeated flattening deformation in use; the tubing having an inner portion highly resistant to degradation or corrosion and therefore inert with respect to the liquids or gases passing therethrough, and an elastomeric outer portion having high resiliency so as to extend the normal life of the tubing under extreme conditions of use.

Another object of this invention is to provide a tubing of the character described, which comprises an inner portion formed of a corrosion resistant, inert fluorocarbon resin and an outer portion formed of a silicone elastomer.

A further object of this invention is to provide a tubing for use as an element of a peristaltic pump wherein the tubing is subjected to a progressive squeezing action followed by expansion of the squeezed portions; the tubing comprising a relatively thin inner portion of a polytetrafluoroethylene resin and a relatively thicker outer portion of silicone rubber whereby the normal life of the inner portion is substantially extended despite the forces incident to the successive squeezing and expanding actions of the pump operation.

Yet another object of this invention is to provide a tubing of the character described for use as an element of a peristaltic pump, wherein the tubing comprises an inner thin layer of corrosion resistant resin and an outer thicker layer of elastomeric material; the outer layer being effective to expand and restore the inner layer to its normal tubular shape after the tubing has been squeezed in the operation of the pump, whereby to extend the life of the tubing as a whole.

other objects of this invention will in part be obvious and in part hereinafter pointed out.

DESCRIPTION OF THE PREFERRED EMBODIMENT

Figure 1:
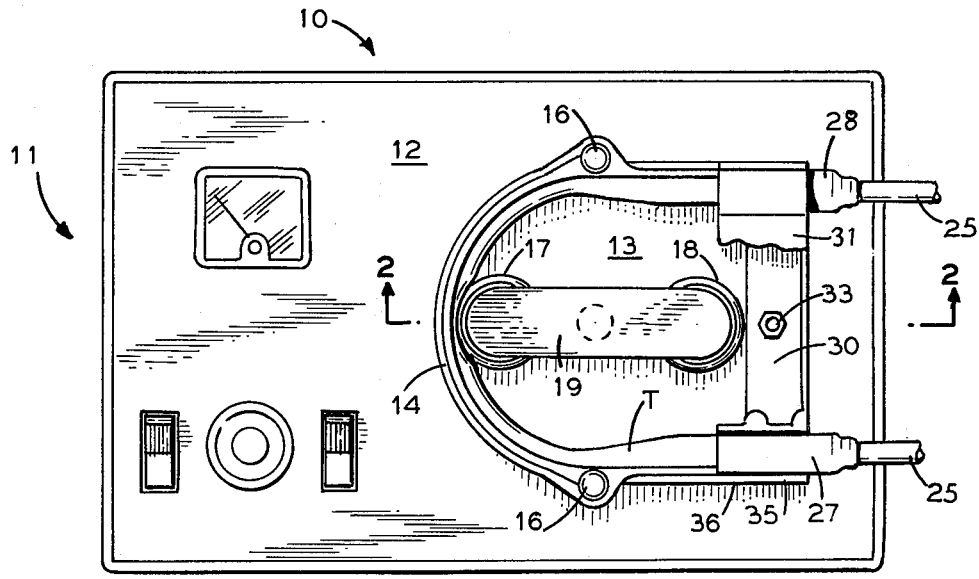
FIG. 1 is a top plan view of a peristaltic pump utilizing tubing embodying the invention.
Figure 2:
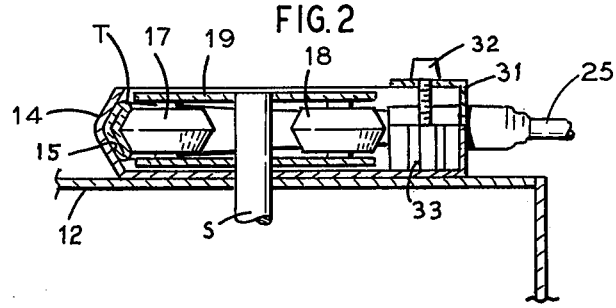
FIG. 2 is a sectional view taken on the line 2—2 of FIG. 1.
Figure 3:
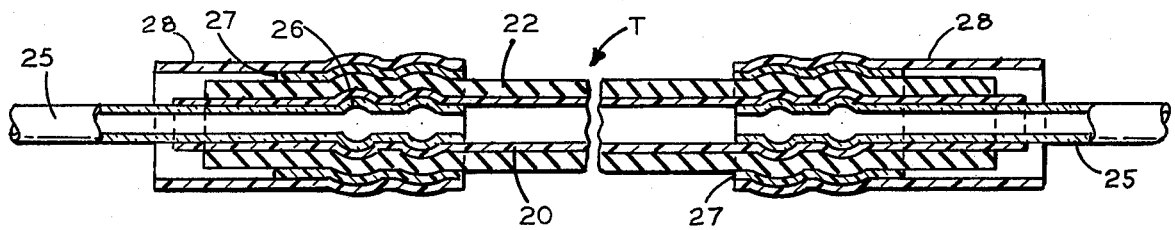
FIG. 3 is a longitudinal sectional view of the tubing.

The tubing of the instant invention is particularly adapted for use in peristaltic pumps, such as that shown in FIG. 1. Here, the pump 10 comprises a casing 11 having a top wall 12. Electric motor means, not shown, is disposed within casing 11 for operating a rotating pressure means generally indicated at 13. Pressure means 13 is aranged for operation in conjunction with the usual backup member 14 of generally U-shape; member 14 having a substantially concave cross section as at 15 for receiving in abutting relation thereto, a tubing embodying the invention and generally designaed as T.

The member 14 is suitably secured to casing wall 12, as by screws 16. The pressure means 13 comprises the usual pair of rollers 17, 18 disposed in spaced relation and rotatably mounted at the opposite ends of an elongated frame member 19. The frame member 19 is connected at its center, to a depending shaft S which extends through a suitable opening in casing wall 12 for connection to the electric motor means, not shown.

The dimensions of member 14 and the location of frame member 19 are such as to bring rollers 17, 18 into squeezing relation to tubing T as frame 19 is rotated. Thus, the walls of tubing T are progressively squeezed to a flat condition and then released to allow the same to expand back to its normal tubular condition; thus providing the desired pumping action, well known in the art.

Tubing T comprises a thin inner portion 20 of a corrosive resistant, inert material such as TEFLON which is a fluorocarbon resin, more particularly polytetrafluoroethylene. Tubing T further comprises a thicker outer portion 22 of a resilient, elastomeric material such as an organopolysiloxane also known as silicone rubber. The portions 20, 22 may be separately preformed and then assembled so that inner portion 20 tightly abuts outer portion 22, all in a manner known in the hose making art.

The inner tubular portion 20 has a wall thickness of the order of from about 0.005 inch to about 0.020 inch and preferably about 0.015 inch; while the outer tubular portion 22 has a wall thickness of from about 0.030 inch to about 0.125 inch and preferably about 0.060 inch.

The opposite ends of the tubing T, providing inlet and outlet portions for pump 10, are attached to glass tubes 25 having corrugated, outer bead portions 26. A heat shrinkable sleeve 27 which may be formed of polyvinyl chloride and a second heat shrinkable sleeve 28 which may be formed of Teflon, are used to tightly interconnect the end portions of tubing T to said glass tubes 25.

The tubing T is suitably located in abutting relation to backup member 14 and the end portions thereof may be anchored by means of a bracket 30 extending between the outer ends of member 14. The ends of bracket 30 are formed to seat the sleeve covered portions of interconnected tubing T and glass tubes 25. A clamping member 31 is removably mounted on bracket 30 by way of a screw 32 passing through a central portion of member 31 and received in an upstanding nut 33 on a mid portion of bracket 30. The opposite ends 34 of member 31 are formed to abut the juncture portion of tubing T, thus overlying sleeve 28; the end edges of said member 31 fitting into recessed edge portions 35 of the terminal end portions 26 of member 14.

It has been found that the composite tubing T provides excellent resistance to corrosion and is inert so as to readily pass acids, alkalies, solvents, toxic and sterile liquids or gases, free of contamination during the pumping action. Further tubing T is highly resistant to the stresses engendered by the pumping action which causes the tubing to be progressively flattened by the squeezing action of rollers 17, 18, followed by expansion of the tubing to its normal tubular shape.

Thus, the inner portion 20 is free of creases since the outer portion 22 is highly effective in restoring inner portion 20 to its normal shape; thereby substantially increasing the life of the tubing as a whole.

The outer portion 22 of tubing T may also be formed of other highly resilient, elastomeric materials including polychloroprene, flexible polyvinyl chloride, natural and synthetic rubbers.

I claim:

1. In combination with a peristaltic pump having a flexible tubular element subject to repeated alternating compression and expansion along the length thereof, wherein the improvement comprises a compressible tubing, said tubing comprising a continuous, thin, smooth-walled inner tubular portion consisting of an inert fluorocarbon resin having a wall thickness of from 0.005 inch to 0.020 inch and a thick outer nonreinforced tubular portion consisting of a resilient elastomeric organopolysiloxane, said outer tubular portion having a wall thickness of from 0.030 inch to 0.125 inch and being operative to restore the compressed inner tubular portion to its normal tubular shape and to thereby avoid creasing said inner tubular portion.

2. The combination as in claim 1 wherein said inner tubular portion is polytetrafluoroethylene.

3. The combination as in claim 1 wherein the outer tubular portion has a wall thickness of about 0.060 inch and the inner tubular portion has a wall thickness of about 0.015 inch.

* * * * *